(12) United States Patent
Tiemann

(10) Patent No.: US 6,595,120 B1
(45) Date of Patent: Jul. 22, 2003

(54) FOODSTUFF LIFTER WITH SIDE ARMS

(75) Inventor: Frank Tiemann, Braham, MN (US)

(73) Assignee: T & L Nifty Products, Inc., Braham, MN (US)

( * ) Notice: Subject to any disclaimer, the term of this patent is extended or adjusted under 35 U.S.C. 154(b) by 0 days.

(21) Appl. No.: 10/068,526

(22) Filed: Feb. 8, 2002

(51) Int. Cl.[7] .............. A23L 1/00; A47J 37/00; A47J 37/04; A47J 43/00; A47J 43/18
(52) U.S. Cl. .............. 99/426; 99/449; 99/450; 211/181.1
(58) Field of Search ............ 99/426, 427, 444–450, 99/394; 126/25 R, 9 R; 211/181.1, 175, 49.1, 60.1; 248/166, 172; 294/1.1, 15, 152, 164, 169; D7/409

(56) References Cited

U.S. PATENT DOCUMENTS

| | | | |
|---|---|---|---|
| 2,514,098 A | 7/1950 | Shreiner | 294/1 |
| 2,549,709 A | 4/1951 | Potts | 99/449 |
| 3,075,798 A * | 1/1963 | Smith | 99/449 X |
| 3,292,831 A | 12/1966 | Moen | 224/49 |
| 4,178,844 A * | 12/1979 | Ward et al. | 99/449 |
| 4,200,040 A | 4/1980 | MacRae | 99/426 |
| 4,718,402 A | 1/1988 | Fordyce | 126/337 |
| 4,741,262 A | 5/1988 | Moncrief | 99/449 |
| 5,638,742 A * | 6/1997 | Kassaseya | 99/426 |
| 6,164,194 A * | 12/2000 | Westmoreland | 99/426 |

* cited by examiner

Primary Examiner—Timothy F. Simone
(74) Attorney, Agent, or Firm—Thomas J. Nikolai; Nikolai & Mersereau, P.A.

(57) ABSTRACT

A lifter for foodstuffs for shifting the same from one position to another including the placing in or removal of various foods to and from cooking utensils without touching the same or piercing the same with forks, knives and the like. The lifter includes a generally rectangular support of a plurality of spaced, longitudinally extending rods or wires bounded by a retaining member having sides. The retaining member is provided with a pair of, side positioned, generally U-shaped handles which are rotatably mounted thereto. Select portions of the retaining member are formed to provide a pair of elevating legs on each of the sides and the handles are provided between such legs. The legs will elevate the foodstuff from the bottom of the utensil or other support surface upon which the laden lifter may be placed.

7 Claims, 3 Drawing Sheets

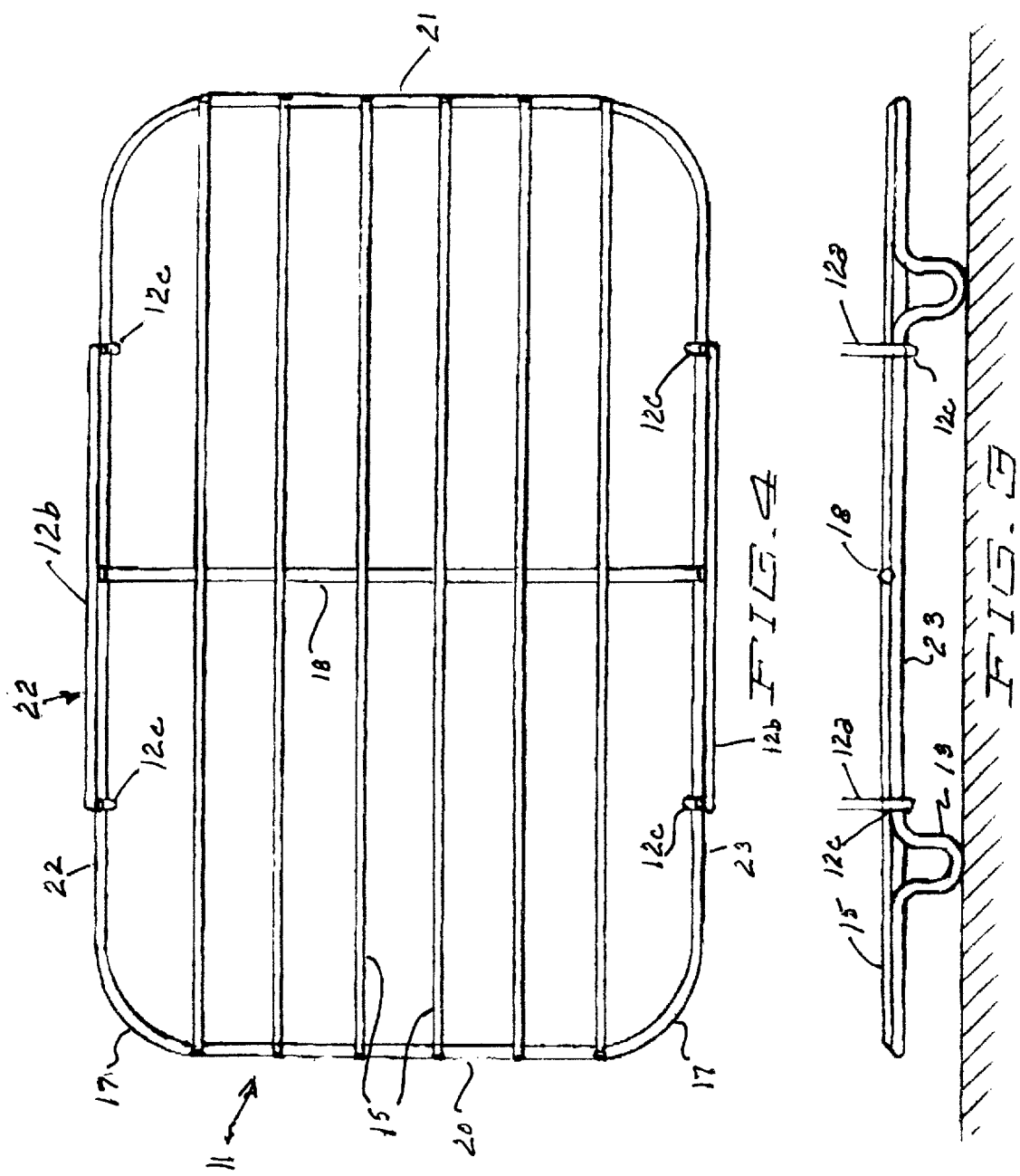

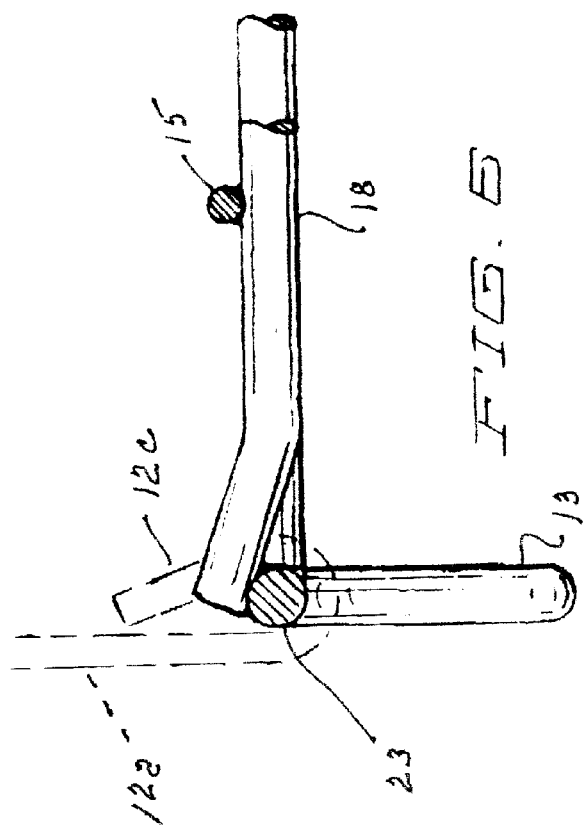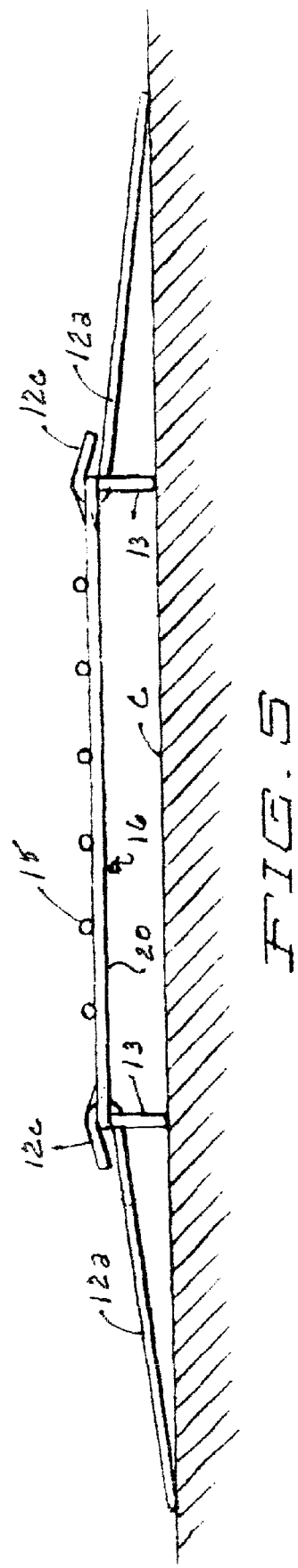

FOODSTUFF LIFTER WITH SIDE ARMS

RELATED APPLICATIONS

Applicant has not filed any and is not aware of any pending applications by others which are directed to the subject matter of this application.

RESEARCH AND DEVELOPMENT OF THE INVENTION

The subject matter of this application was developed solely by the named inventor and was not supported by any Federal or Independent Sponsorship.

PRIOR ART

The applicable prior art of which the applicant is aware is recited in the accompanying Prior Art Statement.

FIELD OF THE INVENTION

This invention relates generally to a support and lifting unit primarily for the handling of foodstuffs and for placing the same into and removing the same from cooking utensils and more specifically to a support and lifting unit for foodstuffs which will permit the thorough cooking of the same and which will provide means for elevating the same from the bottom of a cooking utensil or other support surface which lifting is assisted by a pair of handles along the spaced sides of the unit with the arms being rotatable mounted for collapsing of the unit for storage and similarly, opening into a lifting position such that lifting and transport of the food is accomplished without a person touching the food and without piercing the same with fork, knives and the like.

SHORT SUMMARY OF THE INVENTION

A lifting and support unit for transport of foodstuff which includes a plurality of spaced, longitudinally extending rods, bars or wires bounded by a continuous, formed member, providing sides and ends, to which the longitudinal members are attached. The sides of the unit are provide with pair of downwardly disposed, longitudinally spaced leg elements which serve to elevate the foodstuff above any support surface. A handle is rotatably mounted to the sides and are maintained thereon between the downwardly depending legs of the support surface. These handles are collapsible against the support surface for compact storage of the unit or may be shifted for ease of lifting of the same for moving the foodstuff.

BACKGROUND AND OBJECTS OF THE INVENTION

Various racks and support units have been made for the lifting and moving of foodstuffs such that same may be transferred from one location to another including those that are used to place food into and remove food from cooking utensils. Applicant has made such units and various other, basically simple, such units are listed in the accompanying prior art statement. However, the majority of these units are of considerable bulk making them often, difficult to use and store when not in use.

Applicant provides, through this application, a very simple foodstuff lifting device which permits food handling easily, efficiently and provides a product which may be manufactured at a low cost.

It is therefore an object of the Applicant's invention to provide a foodstuff lifting and moving unit which will elevate the foodstuff from a support surface such as the bottom of a utensil, a kitchen counter or other support surface which does not cause problems in thoroughly cooking the food and which provides handling thereof without a person touching the same nor piercing the same with knives or forks for handling.

It is a further object of the applicant's invention to provide a foodstuff lifter which provides a pair of collapsible handles for ease of storage of the same and means for lifting the foodstuff either into or out of a cooking utensil.

It is yet a further object of the applicant's invention to provide a foodstuff lifter having a plurality of elevating legs to hold the same above a support surface and which legs also serve as locating devices to maintain the use position of a pair of handles for lifting and shifting.

These and other objects and advantages of the applicant's foodstuff lifter will more fully appear from a consideration of the accompanying drawings and description of a preferred form of the invention.

SHORT DESCRIPTION OF THE DRAWINGS

FIG. 3 is a side view of the unit limited to the lower support surface thereof;

FIG. 4 is a top plan view thereof;

FIG. 5 is a partial section taken from a position which allows viewing of the handle mounting with respect to the unit; and, FIG. 6 is a longitudinal section taken substantially along Line 6—6 of FIG. 2 and particularly along one side thereof.

DESCRIPTION OF A PREFERRED FORM OF THE INVENTION

Figure 1:
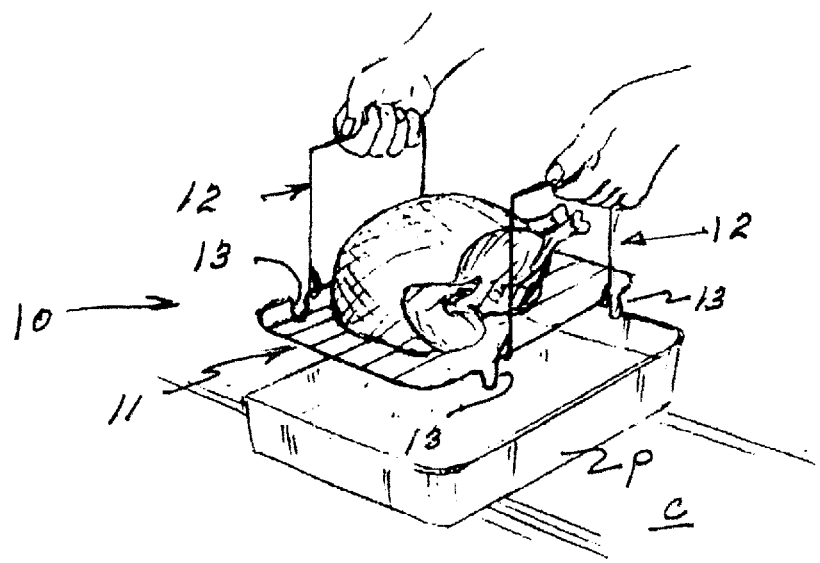
FIG. 1 is a perspective view of the foodstuff lifter embodying the concepts of the applicant's invention and illustrating the same in use.
Figure 2:
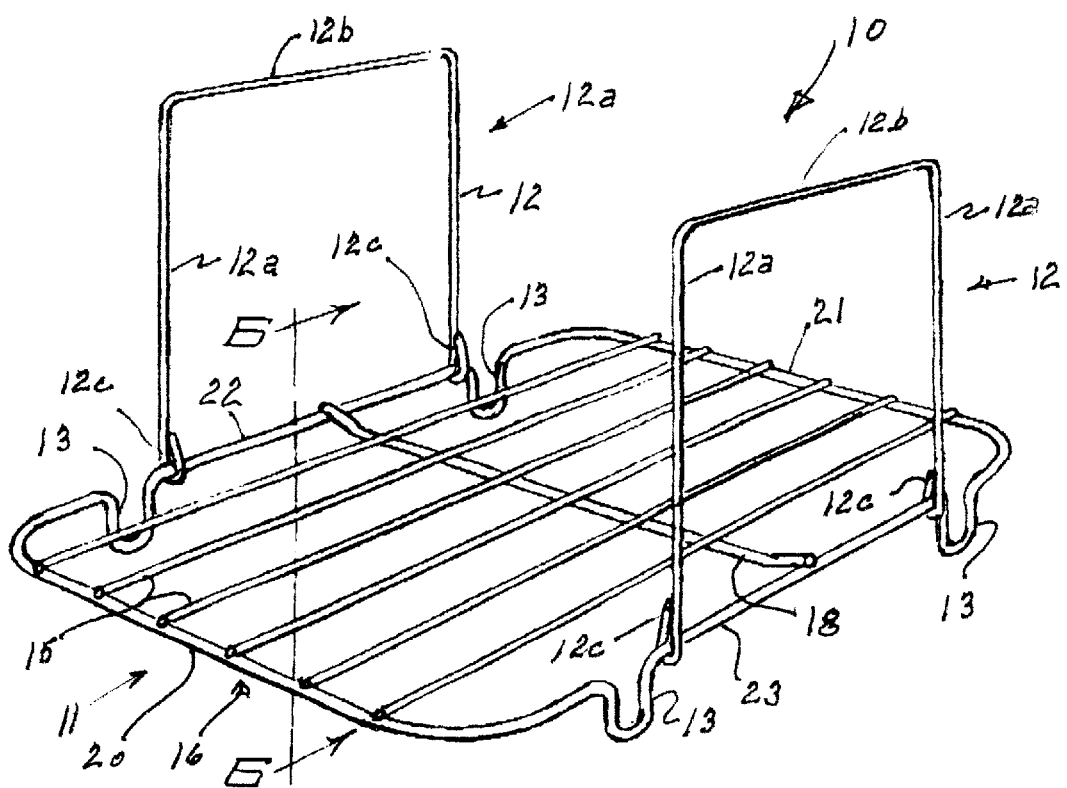
FIG. 2 is a perspective view of the unit.

In accordance with the accompanying drawings, applicant's foodstuff lifter with side arms is designated 10 in its entirety and basically includes a foodstuff supporting and lifting surface 11 and a pair of side handle members 12 with a plurality of downwardly depending legs 13 arranged along the sides of the supporting surface 11. As illustrated in FIG. 1, a foodstuff article, such as a turkey T is being shifted from or into a roasting pan P resting on a counter C.

The foodstuff supporting surface 11 includes a plurality of longitudinally extending, laterally spaced support bars, rods or wires 15, the ends of which are secured to a peripheral bounding member 16 or, in a selected form of a rectangle with smoothly rounded corner sections 17. A transversely arranged mid support 18 may be provided to maintain the supports 15 in proper position and to supply additional strength to this surface member 11.

The selected bounding member provides a pair of ends 20, 21 and sides 22, 23. Arranged in longitudinally spaced relation along sides 22, 23 are a pair of leg members, previously designated 13, which will extend downwardly from the established support surface to elevate the same upon the bottom of a cooking utensil P or any other surface. These legs 13 are smoothly curved and formed to eliminate the collection of food particles and for ease of cleaning thereof Arranged between each pair of legs 13 on each of the sides 22, 23 are a pair of handles, previously designated 12, which are U-shaped to provide a pair of spaced legs 12a, and a grasping, leg spanning and joining member 12b. The lowermost ends 12c of each of the legs 12a are formed around the side elements 22, 23 of the lifting surface 11 such that the handles 12 are rotatably mounted to such side elements 22, 23 to permit shifting thereof from positions which include a position of closely overlying surface 11 to a position of outward extension, as shown in FIG. 5, being splayed from such surface 11. In the overlying position, the entire lifting unit is compact to accommodate storage of the same.

It should be noted that the positioning of the handles 12 between the legs 13 will retain the same in a weight balancing position for the article placed on the support surface 11.

The uniqueness of the applicant's lifter is the basic simplicity of the same while providing a unit that may accommodate foodstuffs of various sizes and weights and support the same in an elevated position. The spacing of the foodstuff support members further insures proper cooking thereof.

What is claimed is:

1. A foodstuff lifter having side arms, comprising:
   a. a one-piece supporting surface;
   b. a peripheral bounding member comprising a continuous wire frame surrounding said supporting surface to define a pair of ends and a pair of sides to said supporting surface;
   c. at least a pair of downwardly disposed supporting members formed in said frame in each of the pair of sides to elevate said supporting surface; and
   d. handle members arranged respectively on each of said pair of sides of said supporting surface and being rotatably mounted thereto.

2. The foodstuff lifter as set forth in claim 1 wherein said supporting surface includes a plurality of longitudinally, transversely spaced elements secured to said ends of said peripheral bounding member.

3. The foodstuff lifter as set forth in claim 2 and at least one transversely disposed member secured to said longitudinally extending, transversely spaced elements.

4. The foodstuff lifter as set forth in claim 1 and said handle members being positioned between said downwardly disposed supporting members.

5. The food stuff lifter as set forth in claim 4 and said handle members including:
   a. a generally U-shaped element provided a pair of legs and a cross member joining said legs; and,
   b. the lowermost portion of said pair leg pairs of said handles being formed about said sides of said peripheral bounding member to permit rotation of said handles about said sides.

6. The foodstuff lifter as set forth in claim 1 and each of said downwardly disposed supporting members being smoothly formed to prevent food accumulation thereon.

7. The foodstuff lifter as set forth in claim 1 and said peripheral bounding member being substantially rectangular in shape with smoothly radiused corners.

* * * * *